Aug. 1, 1933.  A. J. LEWIS ET AL  1,920,265
SPRING AND SPRING CUP MAKER AND ASSEMBLER
Original Filed Jan. 2, 1930   9 Sheets-Sheet 1
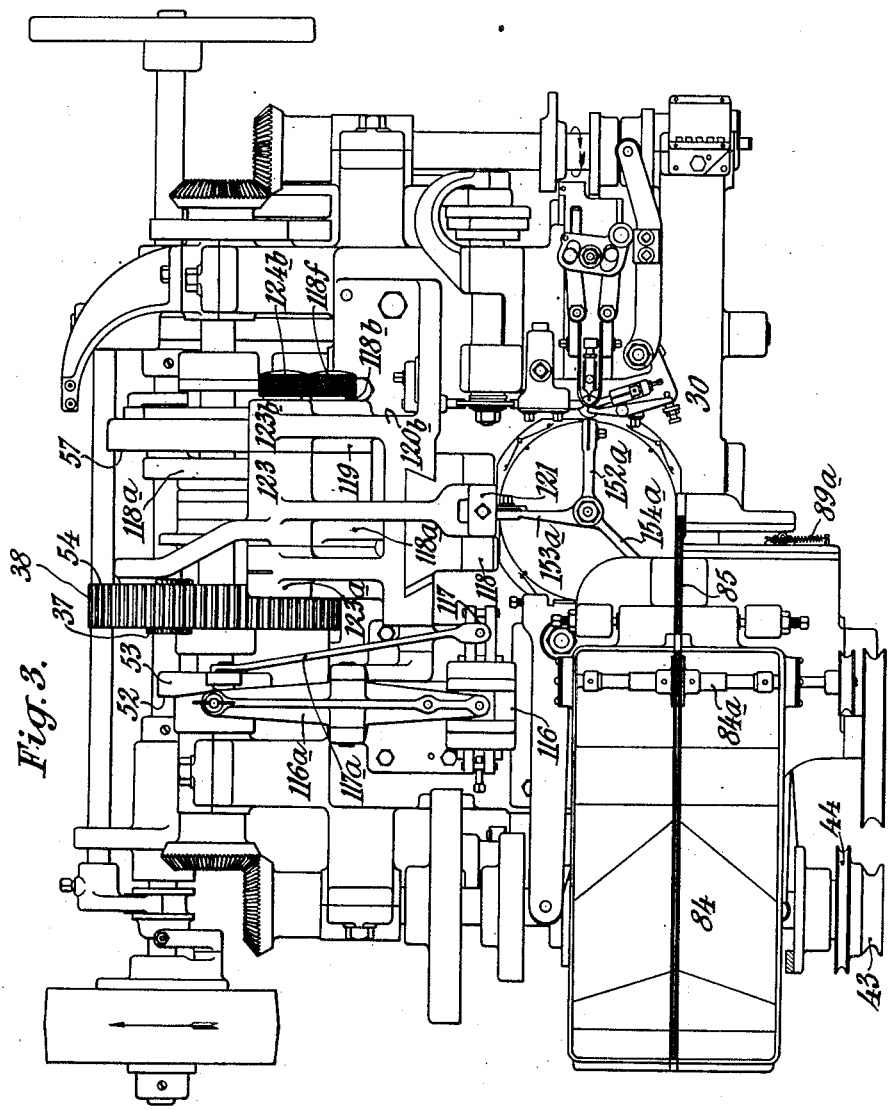
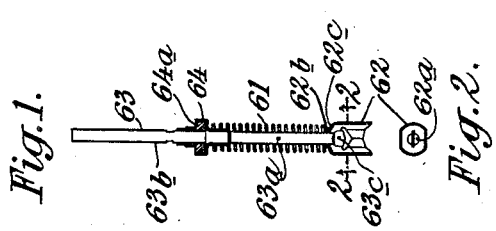
INVENTORS:
Arthur J. Lewis, John W. Richardson
and Charles J. Spill,
Fraser, Myers & Manley.
ATTORNEYS.

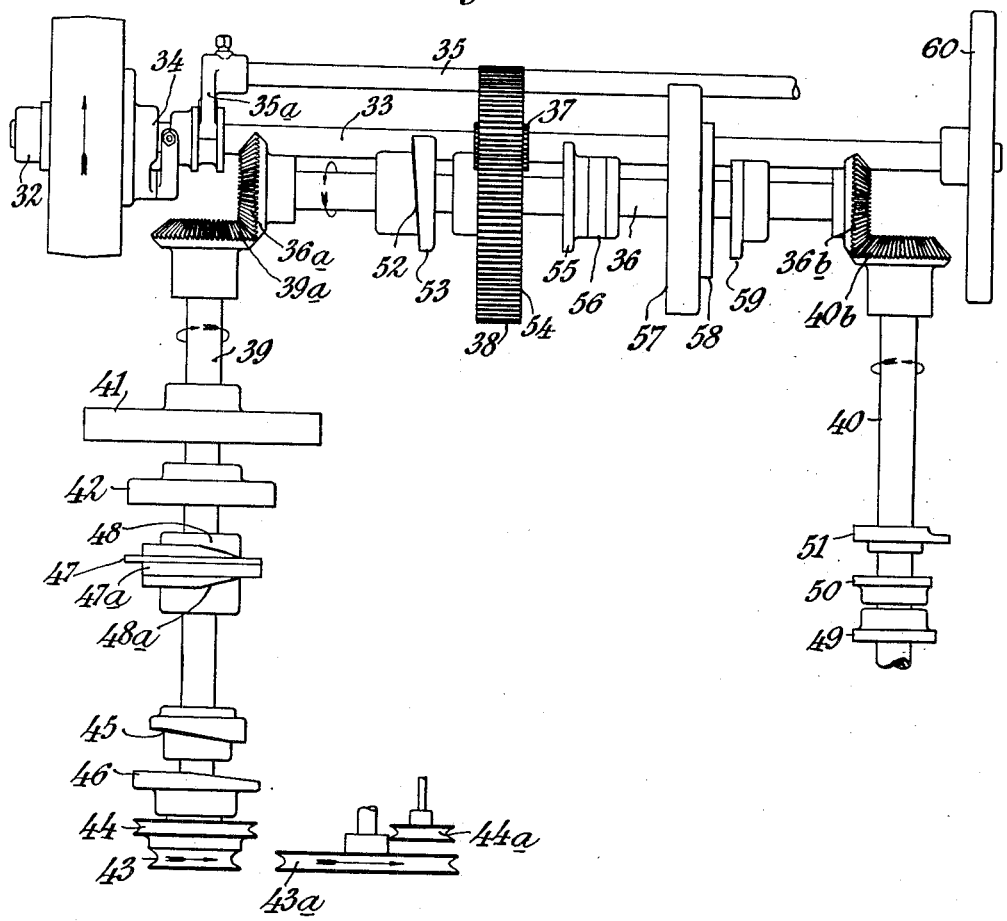

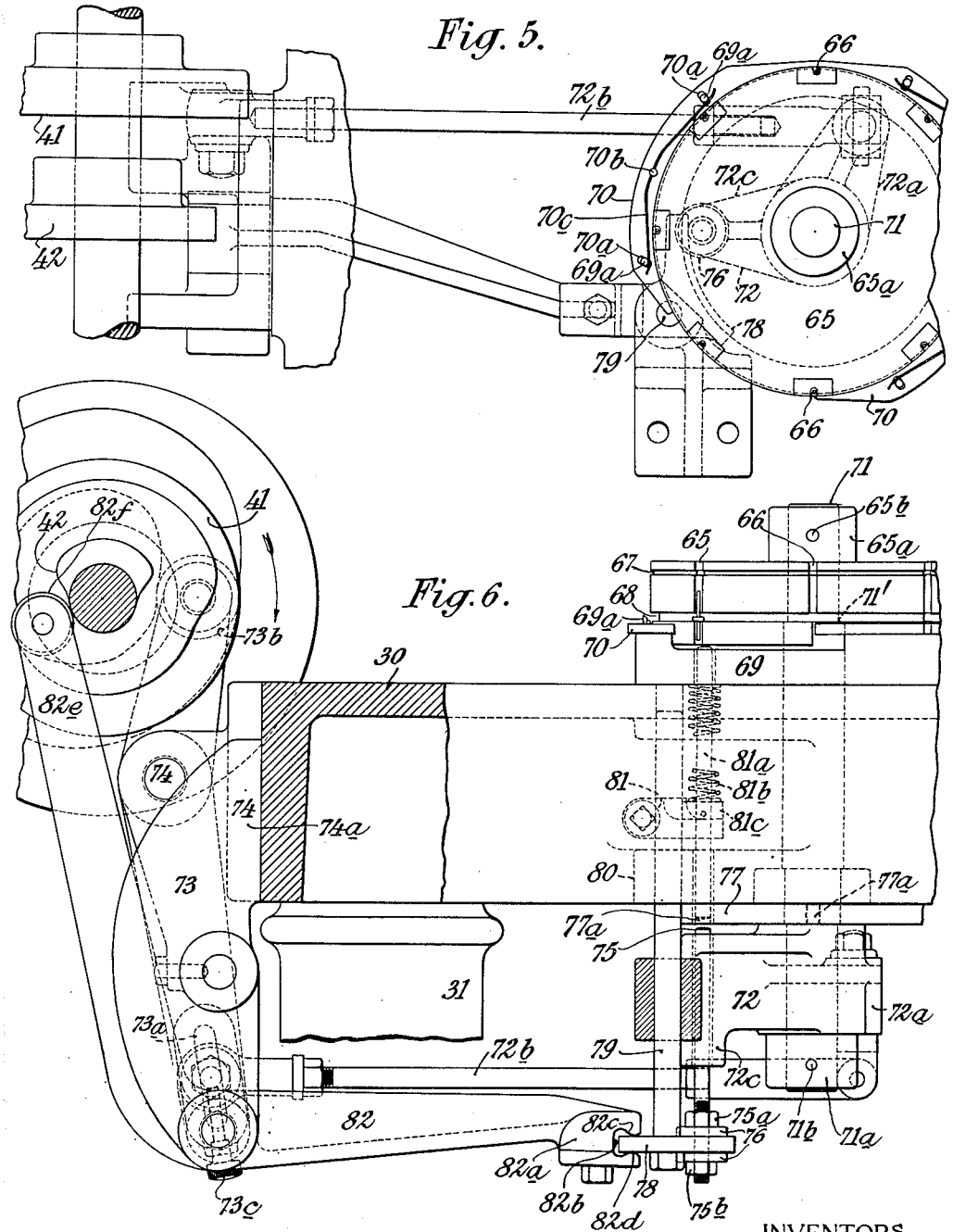

Aug. 1, 1933.  A. J. LEWIS ET AL  1,920,265
SPRING AND SPRING CUP MAKER AND ASSEMBLER
Original Filed Jan. 2, 1930  9 Sheets-Sheet 4
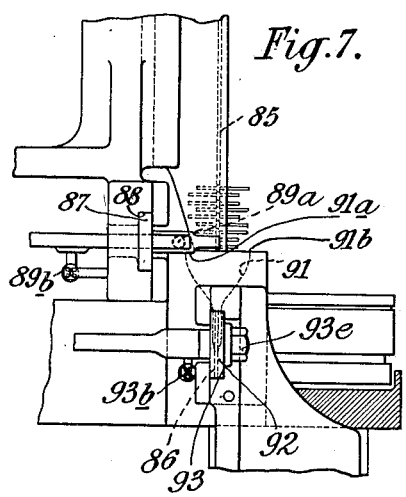
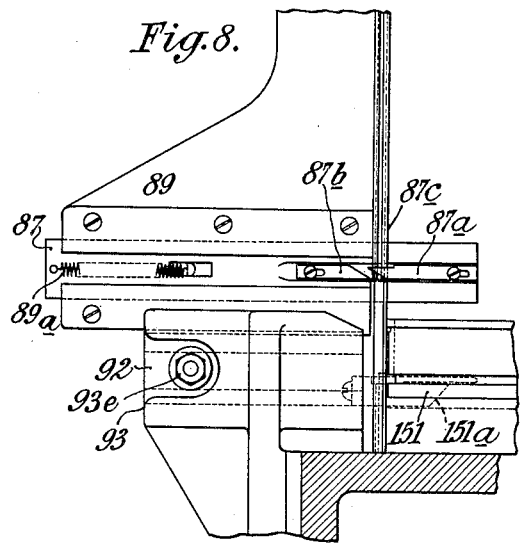
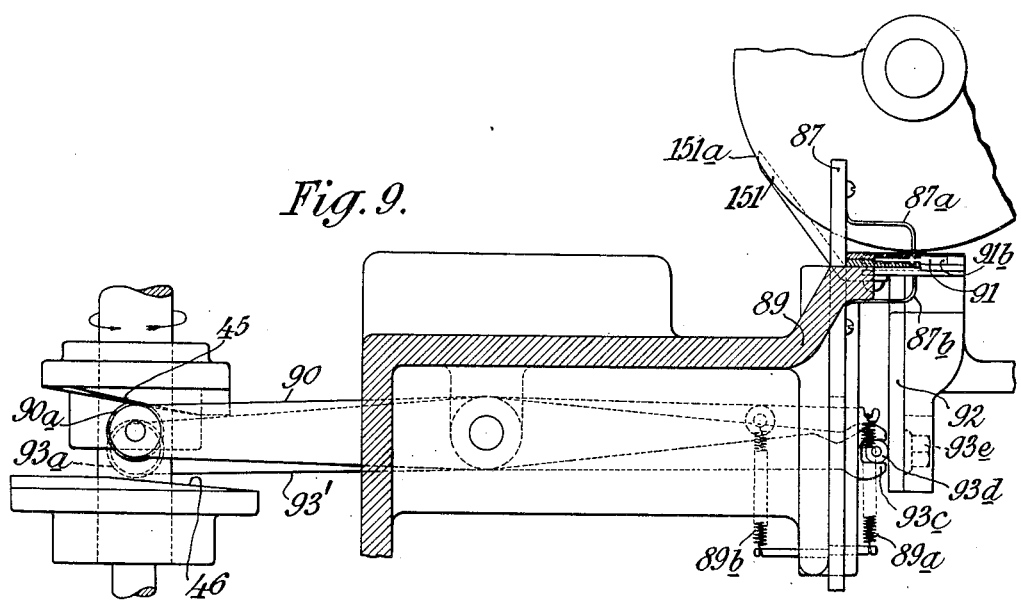
INVENTORS:
Arthur J. Lewis, John W. Richardson
and Charles J. Spill.
Fraser, Myers & Manley
ATTORNEYS.

Aug. 1, 1933.   A. J. LEWIS ET AL   1,920,265
SPRING AND SPRING CUP MAKER AND ASSEMBLER
Original Filed Jan. 2, 1930   9 Sheets-Sheet 5

INVENTORS:
Arthur J. Lewis, John W. Richardson
and Charles J. Spill,
Fraser, Myers & Manley
ATTORNEYS

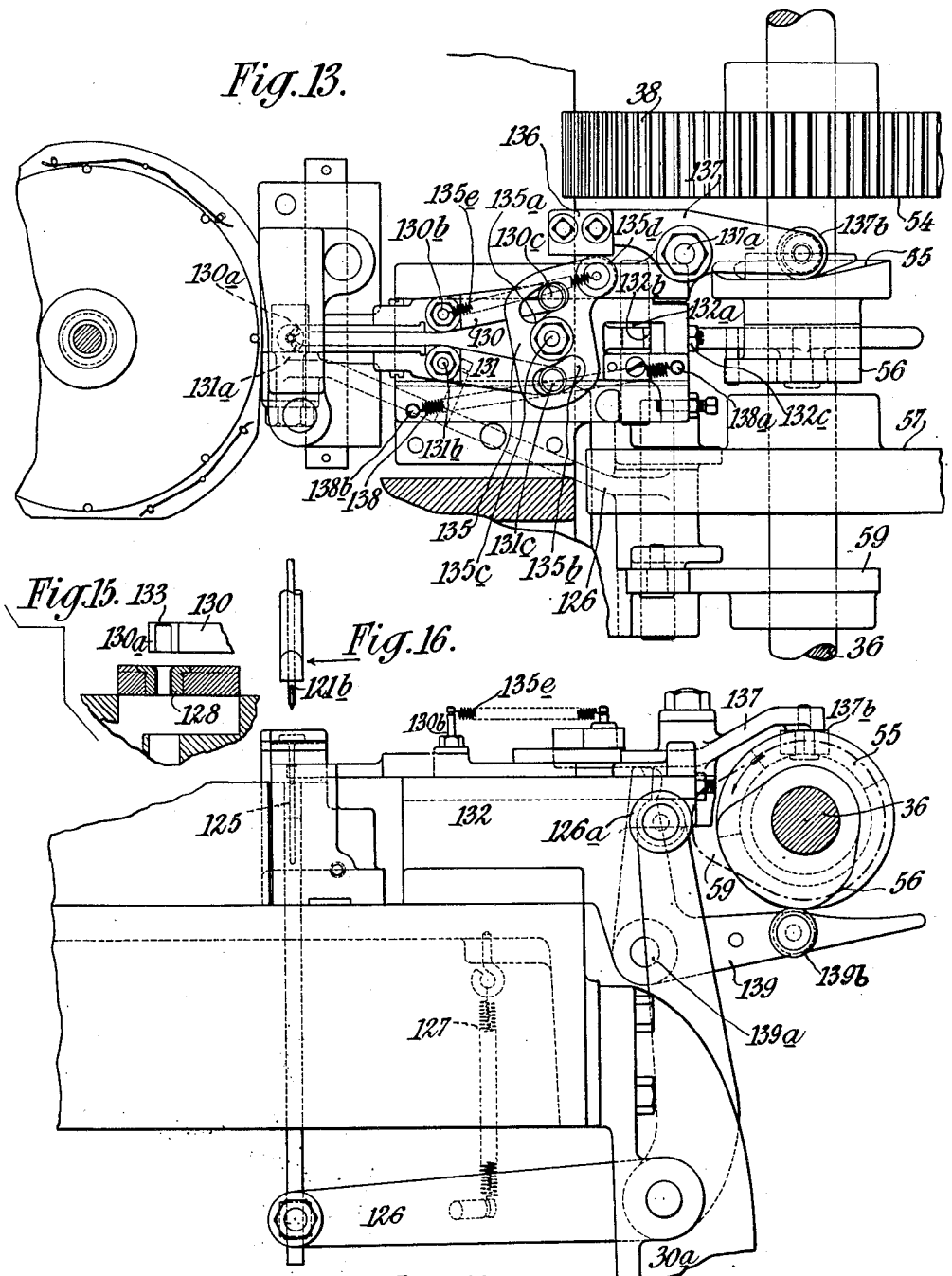

Aug. 1, 1933.   A. J. LEWIS ET AL   1,920,265
SPRING AND SPRING CUP MAKER AND ASSEMBLER
Original Filed Jan. 2, 1930   9 Sheets-Sheet 8
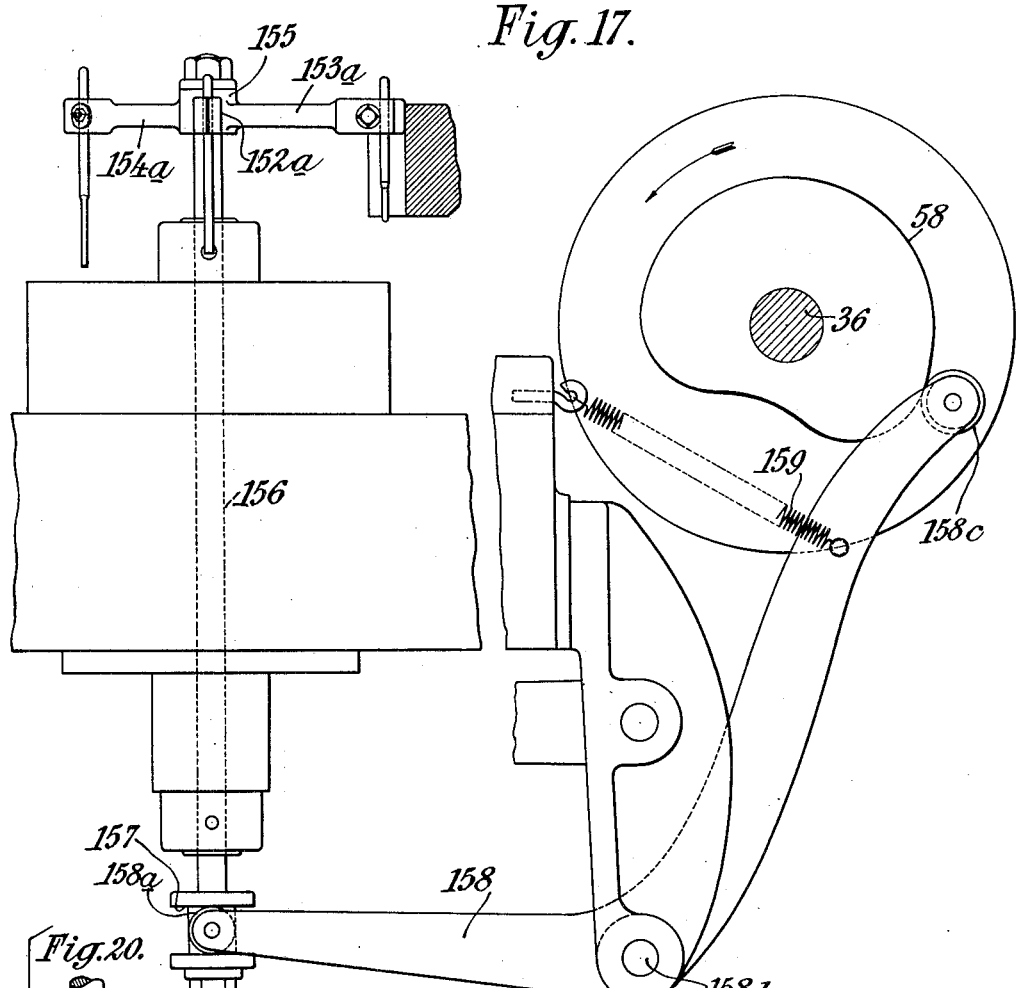
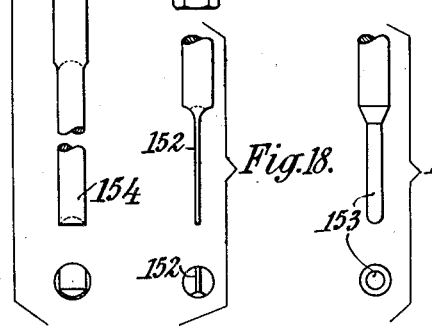
INVENTORS:
Arthur J. Lewis, John W. Richardson
and Charles J. Spill,
Fraser, Myers & Manley.
ATTORNEYS.

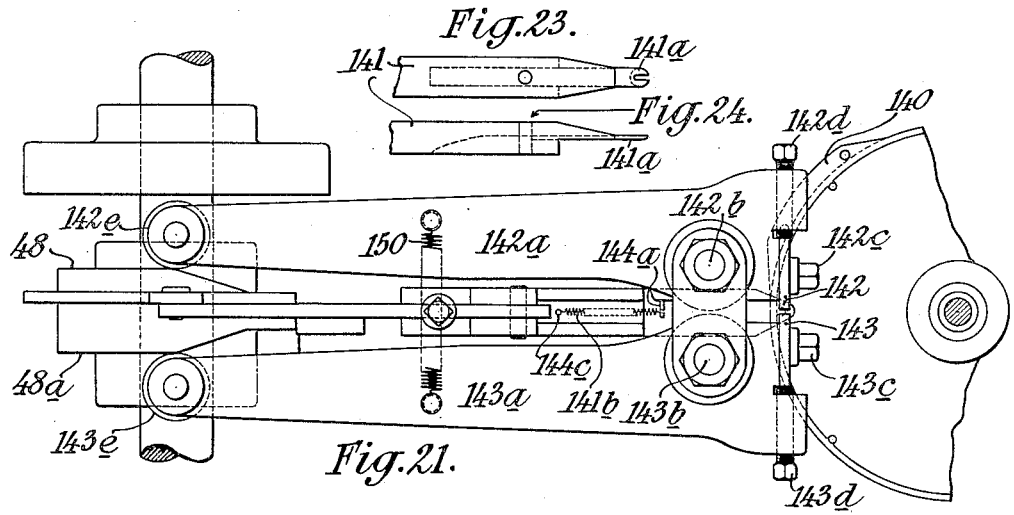

Patented Aug. 1, 1933

1,920,265

UNITED STATES PATENT OFFICE

1,920,265

SPRING AND SPRING CUP MAKER AND ASSEMBLER

Arthur J. Lewis and John W. Richardson, Stratford, Conn., and Charles J. Spill, Garden City, N. Y., assignors to A. Schrader's Son Inc., Brooklyn, N. Y., a Corporation of New York Application January 2, 1930, Serial No. 418,004
Renewed February 17, 1933

19 Claims. (Cl. 29—33.)

This invention relates to a machine for making the valve spring and the valve spring cup of a pneumatic tire valve inside and for assembling said parts upon a valve pin which is provided with a washer support or plunger cup.

In the manufacture of tire valve insides of the type to which the present invention is directed as heretofore carried out, the valve spring and the spring cup were made on separate machines and were assembled on the valve pin through the intervention of both human and mechanical agencies. Although these operations were conducted with a high degree of efficiency, it was recognized that the handling of the small elements by the human fingers was both tedious and trying on the operators, and also proved to be the largest item in the manufacturing cost.

To increase the manufacturing efficiency and to overcome the objections before noted, we have provided a machine in which the various operations of making the spring and the spring cup and assembling said parts upon the valve pin are carried out automatically in a continuous operation.

According to the present invention we provide a machine having a plurality of instrumentalities, by means of which a valve pin having a washer support or plunger cup assembled thereon is fed to an intermittently moving conveyor having a plurality of recesses to receive said pins, which, in turn, are successively conducted to a plurality of stations whereat the following operations are automatically performed with respect to or upon the fed valve pin: the coil spring is formed; the spring is applied upon a pin; a spring cup is blanked out and formed; the cup is applied to the conveyor in superposed relation to the pin; the pin is moved up through the spring cup; the end of the pin is swaged or upset to hold the spring and spring cup in assembled relation on the pin, and the elements as thus assembled are ejected from the machine. The cooperative relation and arrangement of the various instrumentalities is such that the aforementioned operations are carried out in succession continuously with great dispatch. The invention, it will be appreciated, also includes numerous sub-combinations and features of novelty, all of which will be apparent from the detailed description which follows.

An operative embodiment of our invention is shown in the machine illustrated in the accompanying drawings, wherein:

Figure 1 is a longitudinal section partly in elevation of a partially completed valve inside, the same being the final product turned out by the machine of the present invention.

Fig. 2 is a transverse section taken along the plane of the line 2—2 of Fig. 1.

Fig. 3 is a top plan view of the machine forming the subject-matter of the present application.

Fig. 4 is a top plan of the arrangements by which the power is applied to the various operating mechanisms of the machine.

Fig. 5 is a fractional top plan view of the mechanism for controlling the intermittent feed of the dial or conveyor.

Fig. 6 is a side elevation of the mechanism shown in Fig. 5, parts thereof being shown in section.

Fig. 7 is a fractional front elevation of the valve pin feeding mechanism.

Fig. 8 is a side elevation of the mechanism shown in Fig. 7.

Fig. 9 is a top plan view of the mechanism shown in Figs. 7 and 8.

Fig. 13 is a top plan view of the spring cup transferring mechanism.

Fig. 14 is a side elevation of the mechanism shown in Fig. 13.

Fig. 15 is a longitudinal section on an enlarged scale of a detail of the spring cup forming die block and transfer fingers, the latter being shown in elevation.

Fig. 16 is a side elevation of the spring cup forming punch.

Fig. 17 is a side elevation of a mechanism for insuring the transfer of the spring and spring cup at their respective stations and of the ejection of the assembled valve inside at the ejecting station.

Figure 10:
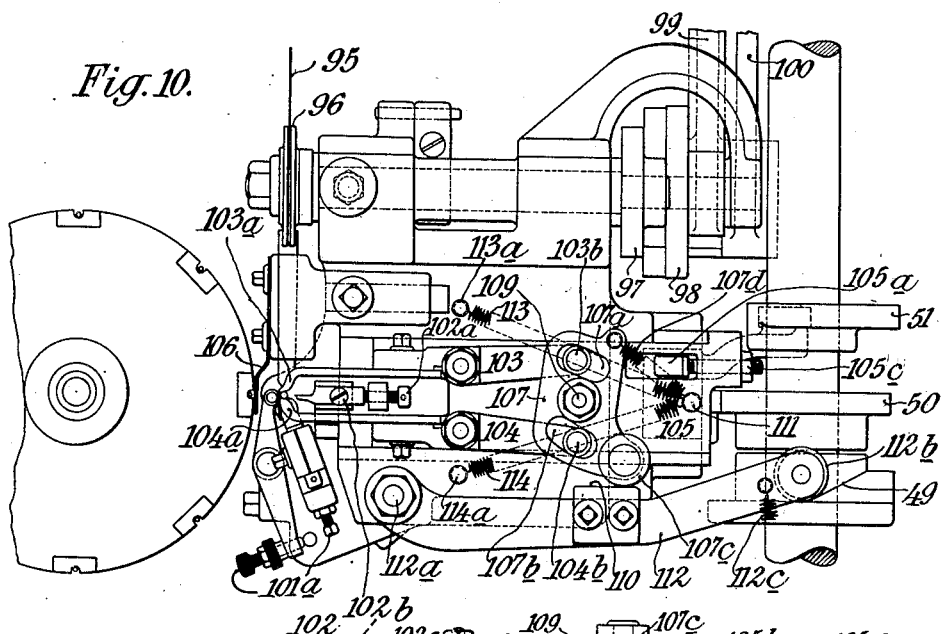
Fig. 10 is a top plan view of the coil spring forming and transferring mechanism.

Figs. 18, 19 and 20 each show a fractional side elevation and plan of the spring feed rod, the cup feed rod and the ejecting rod respectively, shown in Fig. 17.

Fig. 21 is a top plan view of the operative mechanism at the pin swaging station.

Fig. 22 is a side elevation partly in section of the mechanism shown in Fig. 21.

Figs. 23 and 24 are a top plan view and side elevation, respectively, of the spring cup centering means at the pin swaging station.

In order that the manner of operating the various parts of the machine which will be hereinafter described in detail may be clear, the arrangements by which the power is applied to the various mechanisms will be first briefly described.

As shown in the various figures, the parts are either mounted upon or supported by a suitable table 30 carried on a plurality of legs 31. Mounted in suitable bearings supported by the table are a primary driving shaft 32 adapted to be driven by any source of motive power, a secondary shaft 33 adapted to be driven by the shaft 32 through the medium of a clutch 34, which is controllable by an operating rod 35 and clutch shifting yoke 35a. A tertiary shaft 36 is driven from the secondary shaft 33 through the medium of a pinion 37 mounted on shaft 33 in mesh with a gear 38 mounted on shaft 36. Quaternary shafts 39 and 40 are simultaneously driven in opposite directions from the shaft 36 through the medium of miter gears 36a and 39a and 36b and 40b, respectively.

Mounted on the shafts 36, 39 and 40 are numerous cams and pulleys, through the medium of which the various operating mechanisms of the machine are controlled. The functions of these various cams and pulleys will now be briefly described.

Referring first to shaft 39, a groove cam 41 controls the dial indexing or intermittent feed means therefor; groove cam 42 operates the dial locking means; pulleys 43 and 44, through the medium of drive belts (not shown) trained over the pulleys 43a and 44a, respectively, drive operating mechanism for reciprocating and agitating, respectively, the valve pin feeding hopper; cam 45 controls the interrupter means for feeding the pins from the hopper singly in timed relation; cam 46 operates means for transferring a fed pin from a receiving slot into a pin receiving recess in the dial; cam 47 controls the cup centering means at the pin swaging station; cam 47a controls the raising of the valve pin at the pin swaging station; and cams 48 and 48a control the operation of the swaging dies at the pin swaging station. On shaft 40 cam 49 controls the operation of the spring transfer gripping means; cam 50 controls the cut-off means for the formed spring; and cam 51 controls the movement of the spring transferring means from the spring forming station to the spring delivery or applying station. On shaft 36, cams 52 and 53 control the feed and clamping mechanisms, respectively, of the means for intermittently feeding strap metal to the blanking and forming dies; groove cam 54 formed on one of the faces of gear 38 controls the operation of the forming die; cams 55 and 56 control the operation of the cup transfer gripping means and cup transferring means, respectively; groove cam 57 controls the operation of the gang of blanking dies; cam 58 controls the operation of the spring feed rod, the cup feed rod and the ejecting rod; and cam 59 controls the movement of a follower which cooperates with the forming punch at the cup forming station. For manually turning over the machine when required, the shaft 33 is provided at its outer end with a hand wheel 60.

The machine of the present invention is designed to make a helical coil spring 61 from wire fed to the machine, a spring supporting cup 62 from strap metal fed to the machine, and to assemble said spring and spring supporting cup upon a valve pin 63 having affixed thereon a valve washer supporting cup 64 and a valve packing washer 64a within said cup. The assembled article is shown in Fig. 1 of the drawings.

The various subordinate and correlating mechanisms of the machine and their operating means will now be described more in detail.

*The dial conveyor and operation thereof.*—In Figs. 5 and 6 there is shown a dial conveyor and its operating means, which consists of a horizontally disposed flat top dial 65 having peripheral, circumferentially spaced, vertical or upright recesses 66 and spaced circumferential recesses 67 and 68. The recesses 66 are adapted to accommodate in inverted position, valve pins having a packing supporting cup mounted thereon, the supporting cup being adapted to seat upon the lower shoulder formed by the circumferential recess 68. Mounted on the top of table 30 and surrounding the base of the dial 65 in close proximity thereto is a disk-like casting 69, which has resiliently mounted thereon a plurality of expander ring sections 70, said ring sections being provided with spaced elongated slots 70a through which extend pins 69a projecting upwardly from the disk casting 69. Midway between the slots 70a the ring segments 70 each carries a stud 70b through which passes a spring wire 70c, the free ends of which engage in front of the pins 69a. The spring as thus mounted resiliently holds the ring segments in close contact with the peripheral wall of the dial and functions to hold the fed pins within the dial recesses 66. The dial 65 is mounted to seat on a shoulder 71' near the end of a shaft 71 and is held thereon through the medium of a collar 65a formed on the dial and a pin 65b.

At the lower end of the shaft 71 there is loosely mounted a bell-crank lever 72 held in position on said shaft by a collar 71a and pin 71b. Connected to the end of one arm 72a of the bell-crank lever is a connecting rod 72b, the opposite end of which is pivotally connected in an elongate recess 73a in a lever 73 which is pivotally mounted intermediate its ends upon a shaft 74 supported in a bearing 74a affixed to the table 30; and carrying at its other end a roller 73b movable in the cam track formed in the side of cam 41. The end of the other arm 72c of the bell-crank lever is formed as a bearing, within which is vertically movable an index pin 75 which carries at its lower end a roller 76 supported on said pin by a pair of nuts 75a and 75b. The upper end of the pin 75 is free to be moved into and out of openings 77a circumferentially disposed in an index dial 77 which is also mounted on the shaft 71 and rotatable therewith. A number of openings in the index dial correspond to the openings in the dial 65, and said index dial governs the intermittent movement of said dial 65, as will be presently explained. The roller 76 is trained over an arcuate track 78 through which extends a vertical rod 79 which passes through a bearing in a block 80 secured to the machine frame. Fixedly carried by the rod 79 above the bearing block 80 is a cleat 81, through a frame of which passes a vertically extending locking pin 81a, the lower portion of which extends through an opening in the bearing block 80, and the lower end of which is adapted to engage in the openings 77a in the index dial 77 and locking the same against movement. Surrounding said pin 81a is a compression spring 81b, which bears at one end against a collar 81c fixed to the pin; and at its other end against the underface of the disk 69. The spring, it will be apparent, urges the locking pin downwardly into locking position. For adjusting the angular movement of the bell-crank lever 72, the position of the pivot on the connecting rod 72b within slot 73a can be varied by adjusting screw 73c.

Vertical movement of the locking pin 75 is controlled through the rod 79 by means of a bell-crank lever 82, the end 82a of which is forked, as shown at 82b, and receives between the arms of said fork the track 78. The inner faces 82c and 82d of said jaws are rounded to permit a slight rocking of the bell-crank lever with respect to said track. The opposite end 82e of the bell-crank lever carries a roller 82f which moves in a cam track formed in the side face of cam 42.

In Fig. 6 the index dial is shown in locked position, at which time the roller 82f rides over the low of the cam 42. In Fig. 5 there is shown the position of the indexing lever when the roller 73b is on the low of the cam 41 preparatory to riding over the high of said cam, upon doing which the index pin 75 is in an opening 77a of the indexing dial 77 and moves said index dial through an angular distance corresponding to that between the recesses 66 in the dial 65. It will thus be seen that when the dials 65 and 77 are in locked position the index pin moves to engage the index dial 77 preparatory to giving it its next intermittent movement. The novelty of the method and means of indexing the dial conveyor is not herein claimed, as the same constitutes part of the subject-matter of applicant's co-pending application Serial No. 383,398, filed August 3, 1929.

*Valve pin feeding means (Figs. 7, 8 and 9).—* The valve pins which are to be operated upon may be fed to the recesses in the dial 65 in any preferred manner. As herein shown, the valve pins are fed from an oscillatory feed hopper 84 down a raceway or track 85 to a recess 86 from which the pins are delivered to the recesses 66 in the dial.

The feed hopper 84 may be of any conventional form adapted to feed headed pins to the raceway 85, said hopper being driven from the pulley 43 and being fitted with a vibrator 84a which is independently driven from the pulley 44.

The valve pins have a lower portion 63a and upper portion 63b, the latter being shorter than the former, and when said pins are fed from the hopper they do not have these portions all extending in the same direction, as will be apparent from an inspection of Fig. 7. At the lower end of the raceway 85 there is provided an interrupter or cut-off feed for controlling the feeding of the pins singly in timed relation to the dial. The interrupter may be of any approved construction, and as herein shown, consists of a slide bar 87 provided with projecting angular blades 87a and 87b, the adjacent ends of which are chamfered and spaced apart to provide an oblique slot 87c having a width such that as the bar 87 is laterally moved transversely of the raceway 85 in one direction, it will permit a single pin to enter said slot; and as it is moved in the opposite direction it will release said pin to permit it to continue down the raceway. The slide bar 87 is slidable in a track 88 carried by a supporting frame 89 mounted on the table of the machine, and is moved transversely to the raceway against the tension of coil springs 89a and 89b through the medium of a centrally pivoted lever 90, one end of which carries a roller 90a held in contact with the surface of cam 45 by the tension springs 89a and 89b, which springs, as will be apparent from Figs. 7, 8 and 9, each have one end anchored to the lever and the other end anchored to the supporting frame.

As a pin is released from the raceway 85 by the interrupter means, it passes down into a flattened funnel-shaped guide pocket 91, in the bottom of which is a recess 86 for receiving said pin in inverted position. As all the pins are not positioned in the raceway in the same relation with respect to their long and short portions, the top edges 91a and 91b of the funnel-shaped guide 91 serve as abutments for engaging the end of the long portion 63a of the pins as they pass through the interrupter to trip the pins so that the short portion will be lowermost as the pin seats in the recess 86.

From the recess 86 the pin is transferred to a recess 66 in the dial, in which recess the pin seats in inverted position with the packing supporting cup resting on the shoulder of circumferential groove 68. The means for transferring the pin consists of a pusher rod 92 which is operable in a slideway 93 and is controlled in its movement to transfer a pin from the slot 86 to a recess 66 through the medium of a centrally pivoted lever 93' mounted in the same bearing as the lever 90, one end of said lever 93' being provided with a roller 93a which is held against the surface of cam 46 by a coil spring 93b; and the other end of said lever being bifurcated as shown at 93c, said bifurcated end engaging around a roller 93d which is supported upon a pin which passes through the slide rod 92 and held thereon by the nut 93e. It will be understood that the movements of the pin interrupter, the pin transfer rod and the dial are so coordinated through the cams 41, 42, 45 and 46 as to cause the delivery of a pin to each recess 66 in the dial as the same reaches the pin feeding station.

Figure 11:
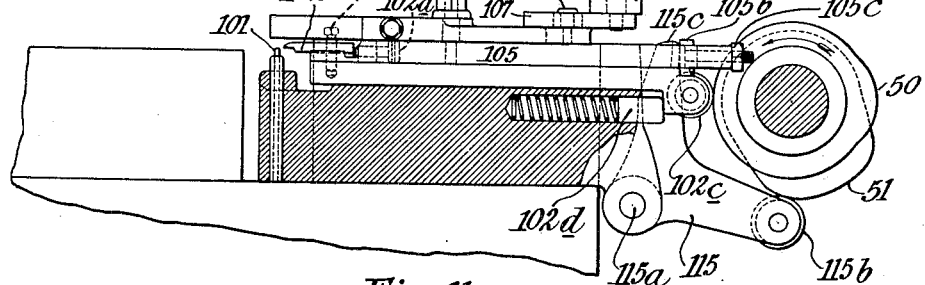
Fig. 11 is a side elevation partly in section of the mechanism shown in Fig. 10.
Figure 12:
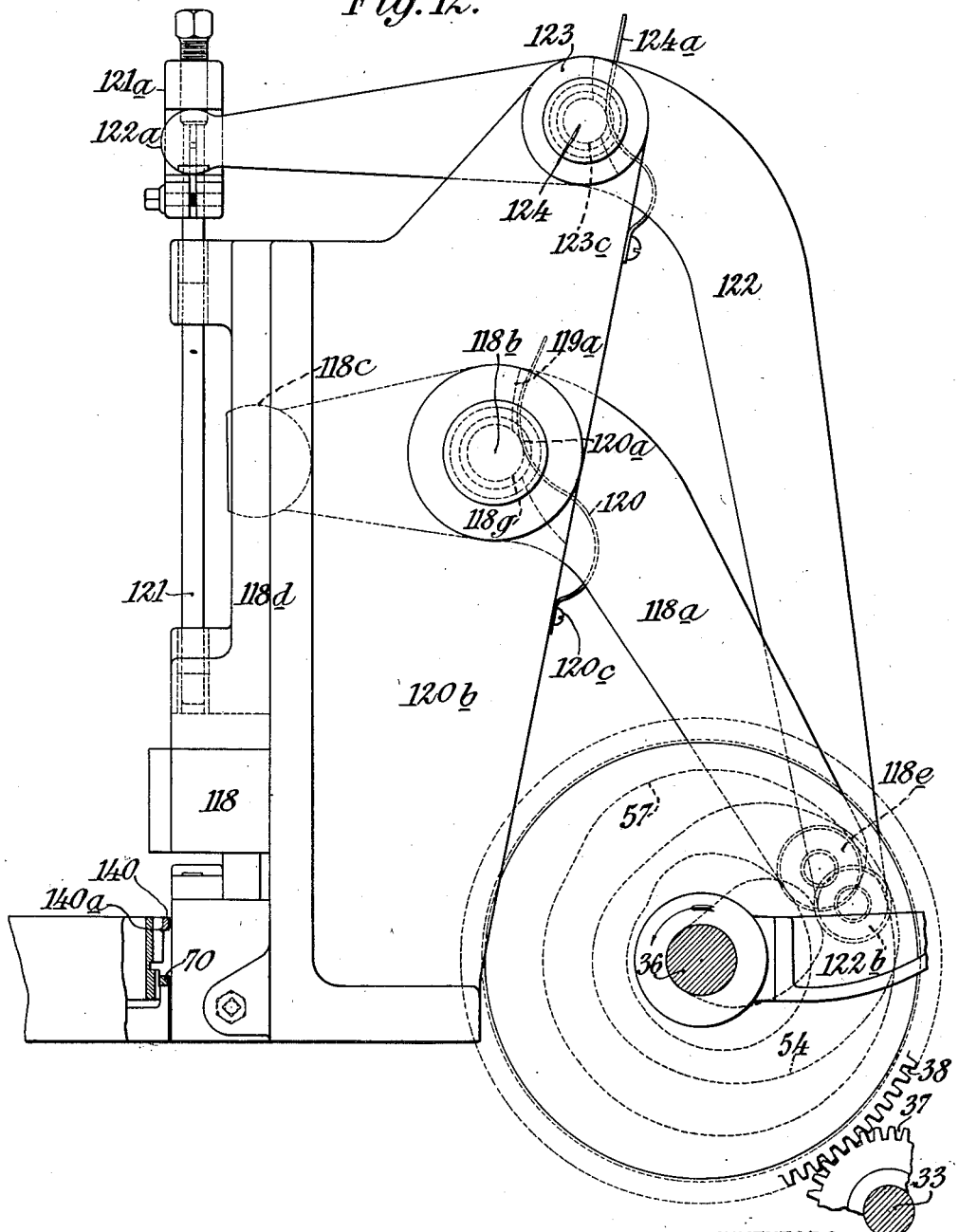
Fig. 12 is a side elevation of the spring cup blanking and forming mechanism, together with its driving connections.

*Coil spring forming and transferring mechanism (Figs. 10 and 11).—*From the pin feeding station the rotatable dial intermittently carries the pins to a following station whereat coil spring 61 is formed and physically transferred from its forming station into position above a recess 66 and there dropped into said recess to engage around the long portion of the pin 63a in the manner as follows:

The coil springs 61 are formed from wire 95 which is fed to a coil spring forming mechanism comprising a guideway 96, driving means 97, 98, 99 and 100, to an arbor 101 around which are provided means 101a for adjusting the diameter of the spring. A detailed description of the spring forming mechanism is not herein given as the same is essentially that described in Patent No. 1,083,501, of January 6, 1914, issued to A. J. Lewis, one of the co-inventors of the present machine.

As a spring is formed around arbor 101 and extends upwardly therefrom to its proper length, a pair of gripping fingers 103a and 104a engage around said formed spring, whereupon a cut-off tool 102 is moved radially inwardly toward the dial to sever said spring from the wire, after which the transfer fingers, while gripping said spring, are moved radially inwardly toward the dial to a point whereat the grasped spring is in superposed relation to a recess 66 in the dial, whereupon the fingers 103a, 104a are moved apart to release said spring, which falls by the action of gravity into said recess and around the pin. To insure the release of said spring from the fingers, a spring feed rod, which will be presently described, is caused to move downwardly over the line of fall of the spring. To guide the spring in its downward movement into the recess, there is provided a leaf spring closure member 106 which engages the periphery of the dial at said station to provide a closure for the recess 66 from the top face of the dial down to the lower circumferential groove therein.

The spring gripping fingers 103a, 104a are carried respectively by the levers 103, 104, which are pivotally mounted intermediate their ends upon a block 105 slidable within a guideway mounted on the table of the machine, the opposite ends of said levers carrying rollers 103b and 104b, respectively, disposed within arcuate slots 107a and 107b formed in a rocker element 107 which is mounted to rock or oscillate about a fixed stud 109, said rocker element 107 having an offset lug at one corner thereof which carries a roller 107c which is held against a slide block 110 by a tension spring 107d, which is secured at one end to a point on the rocker element opposite to the roller 107c, and anchored at its opposite end to a fixed pin 111.

Opening and closing of the gripping fingers 103a, 104a are controlled through the rocker element 107 through the medium of slide block 110, movement of which is controlled by the movement of a lever 112 to which said block is secured, one end of said lever being pivoted to the frame of the machine, as shown at 112a, and the opposite end of said lever carrying a roller 112b which is held against the surface of cam 49 through the medium of a tension spring 112c.

Movement of the slide block 105 toward the dial is accomplished by a pair of tension springs 113, 114, one end of which is anchored to studs 113a and 114a, respectively fixed to the bed of the machine, and at their opposite ends to stud 111 carried by the slide block. Retraction of the spring fingers from the dial is accomplished through the medium of a bell-crank lever 115 which is pivoted at 115a to a lug carried by the table, one arm of said lever carrying a roller 115b riding over cam 51, and the other end 115c of said bell-crank lever engaging in a slot 105a in slide block 105. For adjusting the extent of the rearward movement of the slide block, and with it the position of the gripping fingers, there is provided an adjustable screw 105b extending through the rear end of the slide block and having its head within the opening 105a, and against which the end 115c of lever 115 bears. For holding said screw 105b in adjusted position a nut 105c is provided.

The cut off tool 102 is adjustably mounted on slide block 105 through the medium of set screw 102a, and held in set position through the medium of set screw 102b; and is moved to operative position by engagement of the rise on cam 50 with the roller 102c carried at the rear of slide block 105 and held in contact with the surface of said cam through the medium of a spring pressed plunger 102d. The relative positions of the rises on cams 50 and 51 are such that the cut off tool 102 is first operated, after which the springs 113 and 114 move the slide block forward to position the transfer fingers over the dial, after which the rise 51 engages the roller 115b to retract the slide block to its rearwardmost position. It will thus be seen that the operating mechanism at the spring forming and applying station is substantially as follows:

A predetermined length of coil spring or helix is first formed, the gripping fingers 103a, 104a are moved to engage around said spring, the cut-off tool is moved forward to cut off the spring from the wire, the springs 113 and 114 then move the gripping fingers carrying the spring radially inwardly to a point where the spring overlies the recess in the dial; the spring fingers are then opened and the slide block is then retracted to its rearwardmost position for a repetition of said cycle of operations.

*Spring cup forming and applying station (Figs. 12 to 16).*—From the spring applying station the dial carries the pin fitted with a spring to the spring cup forming and applying station, whereat the spring cup 62, shown in Fig. 1, is formed by being blanked out of strap metal. The strap metal is intermittently fed from a roll (not shown) through the medium of metal feed and clamping means 116 and 117 controlled through levers 116a and 117a, respectively, by cams 52 and 53 respectively, to a gang of blanking dies 118 and a forming punch 121, all of which is best shown in Fig. 3 of the drawings. The gang of blanking dies 118, the details of which are not shown, are operated through a bell-crank lever 118a which has a stud shaft 118b mounted in a suitable bearing 119, one end of said bell-crank being formed with a spherical head 118c adapted to rock within the blanking die carrier member 118d, and the other end of said lever being provided with a roller 118e which rides in the track of gate cam 57. For holding the stud shaft 118b against lateral movement within its bearing, it is fitted at one end with a knurled nut 118f, and intermediate its ends with an annular groove 118g, within which the bite 120a of an S-shaped spring 120 seats, the bearing 119 being provided with a slot 119a for accommodating said spring. The spring 120 is suitably secured to an upright angular portion of the frame 120b, as shown at 120c.

Intermittent reciprocal movement of the forming punch carrier 121 is controlled through the medium of a bell-crank lever 122 having a bearing 123 intermediate its ends through which a stud shaft 124 passes, the ends of said stud shaft being supported in suitable bearings 123a and 123b disposed in alignment with the bearing 123, said bearings 123a and 123b being carried by the upright members of the frame 120b. The stud shaft 124 is held against lateral movement through the medium of a bent spring 124a seating in a slot in bearing 123a; and also having a part seating in a circumferential groove 123c in said bearing in like manner as the spring 120 which seats in the bearing 119; there also being fitted to one end of the stud shaft 124 a knurled nut 124b. One end of the bell-crank lever 122 is provided with a rounded head 122a which rockably engages in an adjustable bearing head 121a; the opposite end of said lever being fitted with a roller 122b which rides in the track of gate cam 54. In the forming of the spring supporting cup 62, the forming punch carrier 121 carries a forming punch 121b, which, in the cup forming operation from the stamped out blank, has cooperating therewith a follower element 125 which is carried by one end of a bell-crank lever 126 pivoted intermediate its ends to a lug 30a extending from the table, and provided at its opposite end with a roller 126a which is held in contact with the surface of a cam 59 by a tension spring 127. The cup 62 is formed within the die block 128, shown in Fig. 15, through the simultaneous and cooperative action of the forming punch 121b and the follower 125. As the former 121b is withdrawn from the die block 128, the follower 125 moves therewith to insure the removal of the formed cup from the die block.

When the formed cup is withdrawn clear of the die block, the ends 130a and 131a of a pair of gripping fingers 130 and 131, respectively, which are pivoted at 130b and 131b, respectively, upon a slide block 132, are moved to engage around the cup to grasp the same and to strip it from the former 121b. To accomplish this the upper inner edge of the fingers are each formed with an overhanging lip 133, as best shown in Fig. 15, which is adapted to engage over the top edge of the formed cup and restrain it from moving upwardly beyond the fingers as the former 121b moves upwardly. The opposite ends of the levers 130 and 131 carry rollers 130c and 131c which engage in arcuate slots 135a and 135b, respectively, formed in a rocking element 135 which is pivotally mounted at its center 135c upon the slide block 132. At one corner the rockable element 135 is provided with a projecting lug which carries a roller 135d which is urged into rolling contact with a block 136 carried at one end of a pivoted lever 137, through the medium of a tension spring 135e. The lever 137 is pivotally mounted intermediate its ends at 137a and carries at its opposite end a roller 137b which is urged into rolling contact with the surface of cam 55 through the pressure upon the block 136 by the roller 135d through the medium of spring 135e. A tension spring 138 anchored at one end to a pin 138a mounted on slide block 132, and at its other end to a pin 138b mounted on the frame of the slideway within which the slide block 132 moves, normally tends to move the slide block, and with it the gripping fingers, inwardly toward the dial. For retracting said slide block after such movement there is provided a bell-crank lever 139 which is pivoted at 139a to a lug carried by the table, one arm of said lever carrying a roller 139b in engagement with the surface of cam 56, and the other end of said lever engaging in a recess 132a formed in the slide block 132. Adjusting means in the form of a headed screw 132b and a nut 132c provide limiting means for the rearward movement of the slide block. The form and positioning of the cams upon the shaft 36 are such that the operation of the gripping transfer fingers 130a and 131a will be as follows:

As the forming die 121b is being raised from the die block 128, the ends of the fingers 130a and 131a engage around the formed cup, strip the same from the forming die, whereupon the spring 138 moves the slide block forward to position the cup above a recess 66 in the dial; the fingers are then opened to release the cup and the lever 139 retracts the slide block 132 for a repetition of said cycle.

When the cup 62 is released by the fingers above an opening in the dial the cup does not drop down upon the pin, but on the contrary is received upon a flange 140a formed on a rim seating ring 140 positioned between the cup applying station and the pin swaging station. The flange 140a seats within the peripheral circumferential groove 67 in the dial and serves to support the cup 62 as it is carried around in a groove 66 from the cup forming station to the pin swaging station.

*Pin swaging station (Figs. 21 to 24).*—When a cup 62 within a recess 66 and supported by the flange 140a of the ring 140 reaches the pin swaging station, the cup which is in superposed relation to the valve pin is first centered to bring the opening 62a in said cup into alignment with said pin so that the latter may be passed therethrough. To accomplish this the cup at its base is formed with a reduced tubular extension 62b which provides the cup with a shoulder 62c which seats upon the flange 140a, and when said cup reaches the swaging station, a centering tool 141 having a feathered, bifurcated end 141a, is moved radially inwardly into groove 67 in the dial to engage around the reduced tubular extension 62b and hold the same centered with respect to a pin in the recess 66 until said pin is moved upwardly through the cup until its upper end extends above the top of said cup, whereupon a pair of swaging dies 142 and 143 are brought together to flatten the end of the pin, as shown at 63c, to hold the spring 61 and cup 62 in assembled relation upon the pin 63.

The cup centering tool 141 is slidably mounted within a slideway formed in a block 144 mounted on the table of the machine, and said tool is urged inwardly toward the dial by a tension spring 141b, one end of said spring being anchored to a pin 144a fixed to the block 144, and the other end anchored to a pin 144c mounted on the tool 141. For controlling the time movements of the tool 141 radially inwardly with respect to the dial, there is provided a bell-crank lever 145 pivoted at 145a to a bracket 146 mounted upon the block 144, said lever at one end carrying a roller 145b in contact with cam 47, and at its other end being in engagement with a projecting lug 141b carried by the tool 141. It will thus be seen that the centering tool occupies its centering position only when the roller 145b rides over the low of cam 47.

For moving the valve pin upwardly through the cup, there is provided a rod 147, the upper end of which is adapted to engage the lower end of the pin, said rod being pivotally connected near its lower end to one end of a bell-crank lever 148, the opposite end of said lever carrying a roller 148a which is held in contact with the surface of cam 47a through the medium of a tension spring 149.

The swaging dies 142 and 143 are carried by levers 142a and 143a, respectively, which are in turn pivoted at 142b and 143b, respectively, to the block 144. The swaging dies 142 and 143 are adjustably mounted within the ends of the levers 142a and 143a, respectively, by the bolts 142c and 143c and set screws 142d and 143d, respectively. The opposite ends of levers 142a and 143a carry rollers 142e and 143e, respectively, said rollers being held in contact with the surface of cams 48 and 48a, respectively, by a common tension spring 150 anchored at its ends respectively to the levers 142a and 143a intermediate their ends. It will thus be seen that when the dial recess 66 having a pin and spring thereon mounted therein, and a cup positioned in superposed relation to said pin reaches the pin swaging station, the centering tool 141 centers the cup with respect to the pin, the rod 147 is moved upwardly to pass the pin through the cup, and the swaging dies are operated to flatten the projecting end of the pin, thus uniting the pin, the spring and the spring cup in assembled relation.

As the dial advances farther, the assembled unit of elements within a recess engages the tapered edge 151a of a kick-out arm 151 which extends into the circumferential groove 68 between the pin swaging station and the pin feeding station, and the assembled unit is thereby ejected from the recess 66 into a suitable receptacle for receiving the same. (See Figs. 8 and 9.)

To insure the release of the spring 61 from the transfer fingers at the spring applying station, and the proper positioning of said spring around the pin within a recess 66, and for insuring the release of the spring cup 62 from the transfer fingers at the cup applying station and its proper seating upon the rim ring in a recess in superposed relation to a pin; and for insuring the discharge or kick-out of an assembled unit upon reaching the ejection station, we have provided a set of tools designated by the reference characters 152, 153 and 154, respectively, carried at the ends of radial arms 152a, 153a and 154a, respectively, carried by a hub element 155, which, in turn, is rigidly mounted upon the end of a shaft 156 extending centrally through the hollow shaft 71 which supports the dial, the lower end of said shaft 156 being provided with a collar 157 within which seats a pair of rollers 158a mounted upon the bifurcated end of one arm of a bell-crank lever 158, which is pivoted at 158b to a lug depending from the table, and which lever 158 carries at its opposite end a roller 158c which is held in contact with the surface of cam 58 by a tension spring 159. The upper ends of the elements 152, 153 and 154 are adjustably held in the ends of arms 152a, 153a and 154a, respectively, through the agency of said arms being split and provided with a clamping screw in a well known manner. It will be apparent that as the roller 158c rides over the dwell in cam 158, the tools 152, 153 and 154 will be simultaneously moved downwardly to perform their intended respective functions.

From the detailed descriptions of the various subordinate mechanisms and their manners of operation, as well as their correlation with the intermittent dial feed of the valve pins to said various operation stations, it will be apparent that we have provided a machine which, in a wholly automatic manner, makes a coil spring, makes a metal cup, feeds valve pins, and assembles said springs and spring cups on said valve pins.

These specific instrumentalities disclosed herein, it is to be understood, are only shown by way of example and are not to be construed as limitations upon the invention, since other instrumentalities in the same or modified combinations may be substituted for those herein disclosed without departing from the spirit of the invention.

What we claim is:

1. A machine of the character described, comprising a conveyor for carrying spaced pins in upright position, said conveyor being intermittently movable to successively present pins at a station, means at said stations for presenting a coil spring above a pin at said station and releasing said spring so that it will drop over the pin by the action of gravity on the spring, and means movable downwardly over the spring to insure its positioning upon the pin.

2. An assembling machine of the character described, comprising a conveyor having a plurality of spaced recesses, said conveyor being intermittently movable to present the recesses successively to different stations, means at one station for feeding a pin to each recess as a recess reaches said station, means at a subsequent station for feeding a coil spring into a recess upon a pin as it reaches said station and means at said last mentioned station for insuring the positioning of the spring within the recess.

3. An assembling machine of the character described, comprising a conveyor having a plurality of spaced recesses, said conveyor being intermittently movable to present the recesses successively to different stations, means at one station for feeding a pin to each recess as a recess reaches said station, means at a subsequent station for applying a coil spring upon a pin as it reaches said station, means in proximity to said station for forming coil springs from wire, means for transferring a spring as it is formed from the spring-forming means and dropping said spring upon a pin, and means for insuring the release of the spring from the transfer means and its positioning around the pin.

4. A machine of the character described, comprising a perforated cup forming mechanism having a forming punch, and means for transferring a formed cup from its forming station to a point laterally spaced therefrom, said transferring means having means for stripping the cup from the forming punch.

5. A machine of the character described, comprising a perforated cup forming mechanism having a forming punch and means for transferring a formed cup from its forming station to a point spaced therefrom, said transferring means comprising a pair of gripping fingers adapted to engage around the cup while positioned about the forming punch, and means on said fingers for engaging over the top edge of the cup as the punch is withdrawn therefrom.

6. A machine of the character described, comprising a perforated cup forming mechanism having a forming punch, means for transferring a formed cup from its forming station to a point laterally spaced therefrom, and means operable at said laterally spaced point for insuring the release of the cup from the transferring means.

7. An assembling machine of the character described, comprising a conveyor having a plurality of spaced recesses, said conveyor being intermittently movable to present the recesses successively to different stations, means at one station for feeding a pin to each recess as a recess reaches said station, and means at a subsequent station for positioning a cup in superposed relation to the pin.

8. A machine of the character described, comprising a rotatable turret having spaced peripheral upright recesses and circumferential grooves in its outer wall, the upright recesses being adapted for receiving valve pins in upright position, and one of said circumferential grooves providing a shoulder upon which the washer support of a valve pin may seat.

9. A machine of the character described, comprising a rotatable turret having spaced peripheral upright recesses and circumferential grooves in its outer wall, the upright recesses being adapted for receiving valve pins in upright position, and an arcuate guiding element extending into the upper of said circumferential grooves adapted to support a cup positioned within an upright recess.

10. A machine of the character described, comprising a rotatable turret having spaced peripheral upright recesses and circumferential grooves in its outer wall, the upright recesses being adapted for receiving valve pins in upright position, an arcuate guiding element extending into the upper of said circumferential grooves adapted to support a cup positioned within an upright recess, the lower circumferential groove providing a shoulder upon which the washer support of the valve pin may seat, means for intermittently rotating the turret to successively present the upright recesses to a plurality of stations, means at one station for feeding a valve pin having a washer support thereon to each upright recess, means at a subsequent station for applying a coil spring to a pin as it reaches said station, and means at a subsequent station for applying a cup into a vertical recess to seat upon the cup-guiding element.

11. An assembling machine of the character described, comprising a conveyor having a plurality of spaced recesses, said conveyor being intermittently movable to present the recesses successively to different stations, means at one station for feeding a pin to each recess as a recess reaches said station, means at a subsequent station for positioning a perforated cup in superposed relation to the pin, means at a subsequent station for moving the pin upwardly through the perforation in the cup, and means for swaging the upper end of the pin after it has been moved through the cup.

12. A machine of the character described, comprising a rotatable dial having a plurality of spaced peripheral, upright recesses, and a circumferential groove in its outer wall, the upright recesses being adapted to receive valve pins in upright position and the circumferential groove being adapted to receive an arcuate guiding element for supporting a cup positioned within an upright recess, said dial being intermittently movable to present the recesses successively to different stations, means at one station for feeding a pin to each upright recess, means at a subsequent station for applying a perforated cup into a vertical recess to seat upon the arcuate guiding element, means at a following station for moving the pin upwardly through the perforation in the cup and means for swaging the upper end of the pin, the arcuate guiding element extending in the circumferential groove between the last two named stations and serving to support the fed cup as it is moved by the dial from the cup-applying station to the pin-swaging station.

13. A machine according to claim 12, having means at the pin-swaging station for centering the perforation in the cup with respect to the pin.

14. A machine according to claim 12, having means at the pin-swaging station for centering the perforation in the cup with respect to the pin, said centering means comprising an element having a bifurcated end which is radially movable into the recess in the dial below the arcuate guiding element.

15. An assembling machine of the character described, comprising a conveyor having a plurality of spaced recesses for receiving a valve pin having a washer support mounted thereon, said conveyor being intermittently movable to present the recesses successively to spaced apart stations whereat the following mechanisms are operable: means for feeding a pin to each recess; means for applying a coil spring around the pin; means for applying a perforated cup in superposed relation to the pin; means for moving the pin upwardly through the perforated cup; means for operating on said assembled parts to prevent their separation; and means for discharging the assembled units from the recesses, the various mechanisms being intermittently time-controlled 16. An assembling machine according to claim 15, having means at the spring-applying station, at the cup-applying station and at the discharging station for insuring proper positioning and discharge of the respective elements.

17. An assembling machine according to claim 15, having means at the spring-applying station, at the cup-applying station and at the discharging station for insuring proper positioning and discharge of the respective elements, said means comprising a downwardly-movable plunger at each of said last named stations, said plungers being simultaneously operable.

18. A machine of the character described, comprising pin-feeding means, a rotatable dial having peripheral recesses for receiving the pins, means for feeding pins to a point radially spaced from the dial, and means for pushing a fed pin radially inwardly into the dial recess, the movement of the various means being intermittently and operatively timed.

19. A machine of the character described, comprising pin-feeding means, a rotatable dial mounted on a vertical axis having vertical peripheral recesses for receiving the pins, means for feeding the pins to a point radially spaced from the dial, whereat said pins assume a vertical position, and means for pushing a fed pin radially inwardly into the dial recess, the movements of the various means being intermittently and operatively timed.

ARTHUR J. LEWIS.
JOHN W. RICHARDSON.
CHARLES J. SPILL.